United States Patent [19]
Park et al.

[11] Patent Number: 6,097,125
[45] Date of Patent: Aug. 1, 2000

[54] MAGNET FIXED STRUCTURE FOR COMPRESSOR MOTOR

[75] Inventors: Jung Sik Park, Kwangmyung; Hyeong Kook Lee, Kunpo; Jong Tae Heo, Seoul; Seong Yeol Hyun, Changwon, all of Rep. of Korea

[73] Assignee: LG Electronics Inc., Rep. of Korea

[21] Appl. No.: 09/067,714

[22] Filed: Apr. 28, 1998

[30] Foreign Application Priority Data

Apr. 29, 1997 [KR] Rep. of Korea ................. 97-16049
May 28, 1997 [KR] Rep. of Korea ................. 97-21208

[51] Int. Cl.[7] .................................................. H02K 21/12
[52] U.S. Cl. ............................ 310/156; 310/91; 310/261
[58] Field of Search ............................ 310/156, 216, 310/217, 218, 261, 264, 265, 89, 91, 43, 67 R; 29/596, 598

[56] References Cited

U.S. PATENT DOCUMENTS

| | | | |
|---|---|---|---|
| 4,227,105 | 10/1980 | Kumakura | 310/153 |
| 4,549,341 | 10/1985 | Kasabian | 29/598 |
| 4,591,525 | 5/1986 | Stokes | 310/156 |
| 4,724,348 | 2/1988 | Stokes | 310/152 |
| 4,857,786 | 8/1989 | Nihei et al. | 310/156 |
| 4,954,736 | 9/1990 | Kawamoto et al. | 310/156 |
| 5,353,491 | 10/1994 | Gentry et al. | 29/596 |
| 5,488,260 | 1/1996 | Heyraud | 310/156 |
| 5,744,887 | 4/1998 | Itoh | 310/156 |
| 5,751,075 | 5/1998 | Kwon et al. | 310/12 |

*Primary Examiner*—Nestor Ramirez
*Assistant Examiner*—Tran N Nguyen
*Attorney, Agent, or Firm*—Ostrolenk, Faber, Gerb & Soffen, LLP

[57] ABSTRACT

A magnet fixed structure for a compressor motor, which includes a cylindrical magnet paddle in which a plurality of magnet insertion holes are formed along a circumference thereof or a cylindrical magnet paddle alone, a plurality of magnets inserted into the magnet insertion holes of the magnet paddle or fixed to the magnet paddle, and a magnet fixing ring or a varnish-type molding member for fixing the magnets, effectively fixes the magnets to the magnet paddle, for thereby improving reliability and efficiency of the compressor motor as well as mass-productivity thereof.

6 Claims, 11 Drawing Sheets

MAGNET FIXED STRUCTURE FOR COMPRESSOR MOTOR

BACKGROUND OF THE INVENTION

1. Field of the Invention

The present invention relates to a compressor motor, and more particularly to a magnet fixed structure for a compressor motor that improves reliability and efficiency of a compressor motor and increases mass productivity thereof by applying magnet fixing rings or a molding member in order to fix magnets to a magnet paddle.

2. Discussion of the background

FIG. 1 illustrates a linear compressor, which includes a hermetic vessel 10 which forms a housing of the compressor. The linear compressor includes, in part, an outer lamination 20 and an inner lamination 30, a cylinder 35, a magnet paddle 40, a piston 50, and a flange 80.

The inner lamination 30 is fixed at an inner side of an inner wall of a circumferential portion of the flange 80, and the outer lamination 20 is fixed at an outer side of the inner wall of the circumferential portion of the flange 80, the outer lamination 20 is spaced a predetermined from the inner lamination 30.

The magnet paddle 40 to which a plurality of magnets (not shown) are fixed is disposed between the inner lamination 30 and the outer lamination 20. Here, in order to improve efficiency of the compressor motor, each of the magnets fixed to the magnet paddle 40 should be provided thicker than an empty space between the two laminations 20, 30.

A plurality of helical-plate springs 60 are fixed at an end portion of the flange 80, and the piston 50 which linearly reciprocates in the cylinder 35 is coupled with a center portion of an inner side of the springs 60.

The cylinder 35 may be made up of the flange 80 itself, or formed separate from the flange 80 and fixed in the flange 80. In this example according to a convention art, the cylinder 35 is formed of the flange 80 itself.

The magnet paddle 40 connected to the piston 50 as a single body also reciprocates between the inner and outer laminations 30 and 20, together with the piston 50 which makes a linear reciprocation in the cylinder 35. The, the magnets are fixed to a predetermined portion of an outer circumferential surface of the magnet paddle 40.

A valve assembly 65 is provided at one side of the cylinder 35 and each muffler 70 is disposed at both sides of the valve assembly 65.

Now, referring to FIGS. 2A and 2B, a first example of a conventional structure in which the magnets are fixed to the magnet paddle 40 will be described.

According to the first example of the conventional magnet fixed structure, magnets 90 are fixed to an outer circumferential surface of the magnet paddle 40 by an adhesive at regular intervals. A plurality of slits 40a are formed in the magnet paddle 40 in order to reduce eddy current loss.

In FIG. 2A, a reference numeral 20a is a coil which is disposed in the outer lamination 20 and a power source is applied thereto, and a numeral 55 is a connecting member which connects the piston 50 to the magnet paddle 40.

With reference to FIGS. 3A and 3B, a second example of the conventional structure in which the magnets are fixed to the magnet paddle 40 will be described.

As shown therein, a plurality of grooves 41 for fixing the magnets are formed at the magnet paddle 40, and a plurality of magnets 90 are fixed to the corresponding grooves 41 by an adhesive.

However, according to the two above-described examples of the conventional magnet fixed structure, heat generated by the high-speed operation of the motor deteriorates the adhesive strength of the magnets and the magnet paddle, thus the magnets 90 eventually seperate from the magnet paddle 40.

With reference to FIGS. 4A and 4B, a third example of the conventional structure in which the magnets are fixed to the magnet paddle 40 will be described.

First, a base ring 42 and an end ring 43 are provided, and insertion grooves 42a and 43b are formed at facing surfaces of the base ring 42 and the end ring 43 and a plurality of magnets 90 are inserted into the corresponding grooves 42a and 43b.

After the magnets 90 are inserted to each of the insertion grooves 42a, 43a, the base ring 42 and the end ring 43 which hold the magnets 90 are fixed by slender bolts 44.

A reference numeral 45 is a nut for screwing onto each of the bolts 44 to fix the magnets 90, and reference numerals 20, 30 and 20a are the outer lamination, the inner lamination, and the coil, respectively.

However, since the above magnet fixed structure using the bolts 44 requires a complicated assembling process and a wide empty space between the inner 20 and outer 20 laminations, mass productivity of the compressor motor is limited and efficiency of the compressor motor is deteriorated.

SUMMARY OF THE INVENTION

Accordingly, an object of the present invention is to provide a magnet fixed structure for a compressor motor that improves mass productivity of a compressor motor by preventing magnets from separating from a magnet paddle.

Another object of the present invention is to provide a magnet fixed structure for a compressor motor that improves efficiency of a compressor motor by minimizing an empty space between an inner lamination and an outer lamination.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a magnet fixed structure for a compressor motor wherein an inner lamination and an outer lamination are provided includes: a cylindrical magnet paddle operating between the inner lamination and the outer lamination, and having a plurality of magnet insertion holes or without the magnet insertion holes; a plurality of magnets which are respectively inserted into the magnet insertion holes of the magnet paddle or fixed to the magnet paddle; and a magnet fixing ring attached to both inner and outer surfaces of the magnet paddle, or attached to either an inner surface or an outer surface of the magnet paddle, or a molding member for forming a molding layer.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
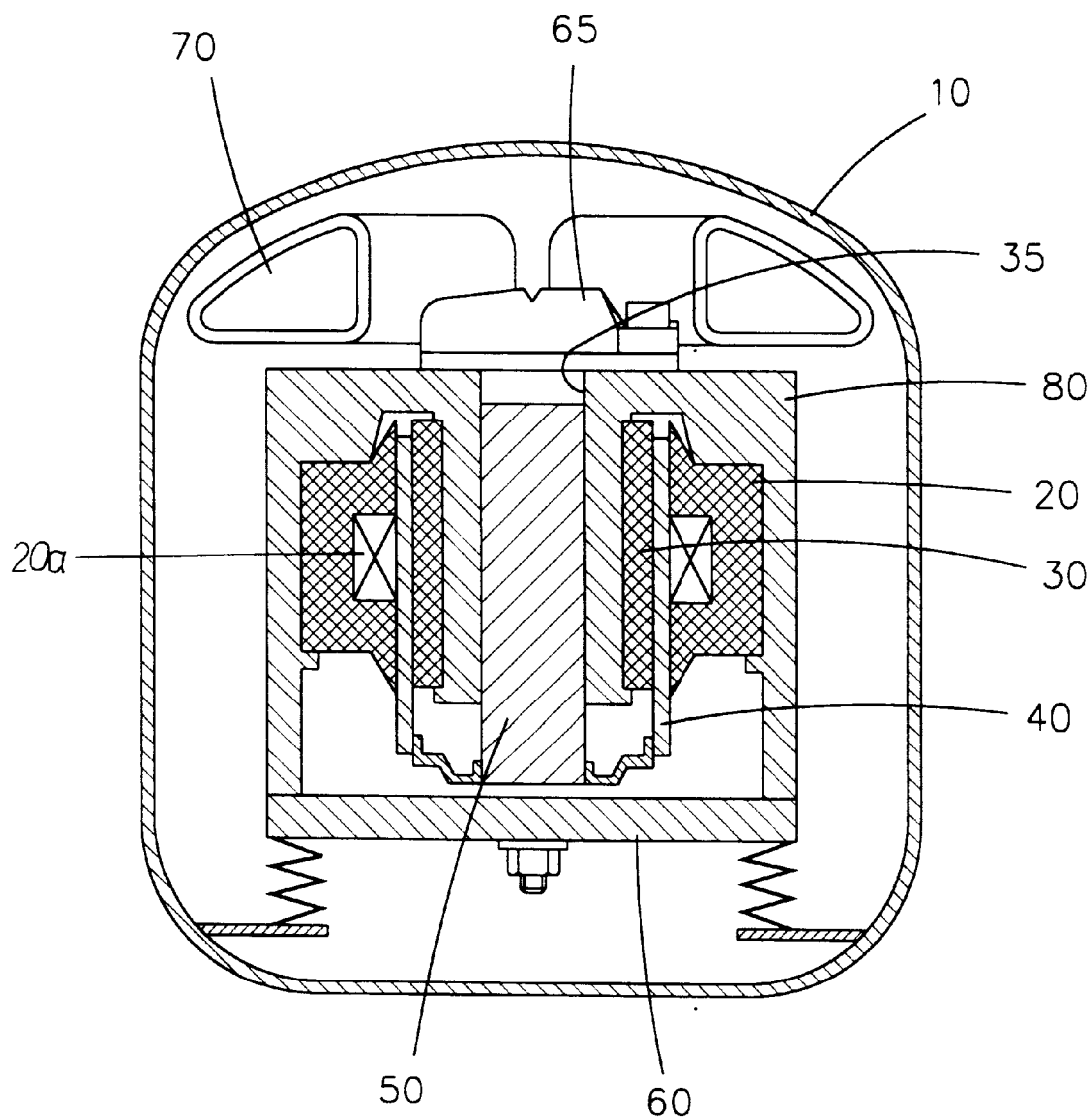
FIG. 1 is a structure diagram of a conventional linear compressor.
Figure 2A:
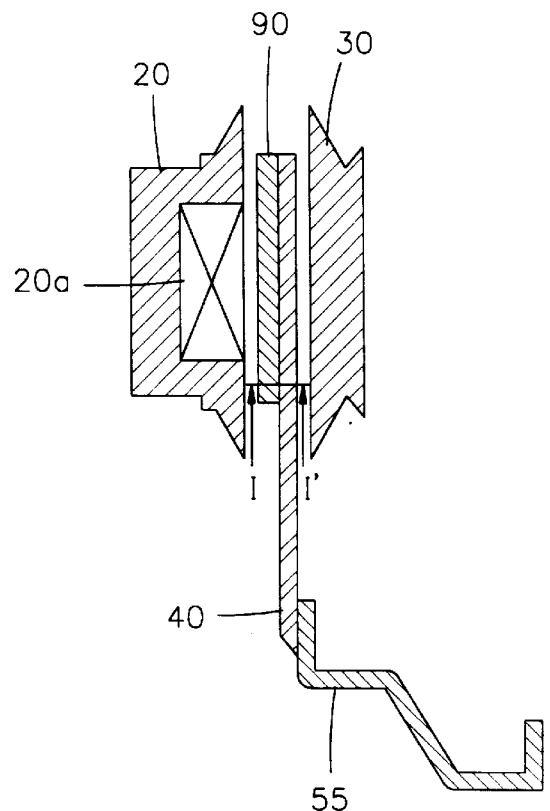
FIG. 2A is a vertical cross-sectional view according to a first example of a magnet fixed structure of the conventional linear compressor.
Figure 2B:
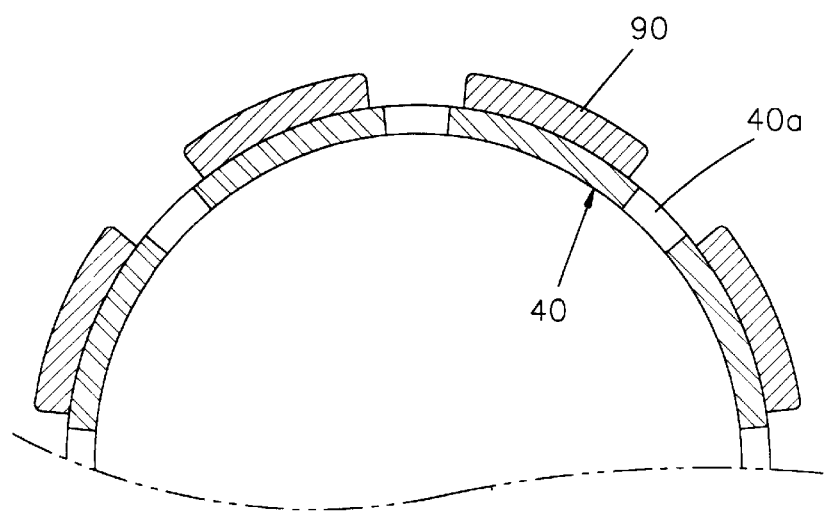
FIG. 2B is a cross-sectional view taken along the line I–I' in FIG. 2A.
Figure 3A:
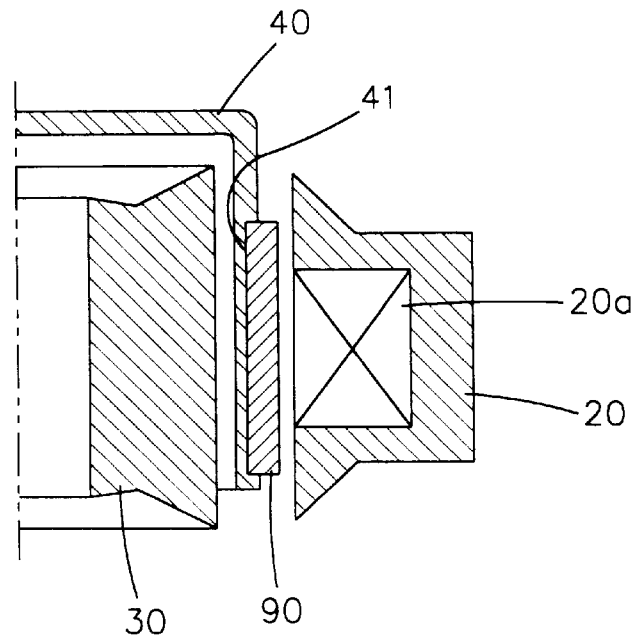
FIG. 3A is a cross-sectional view according to a second example of the magnet fixed structure of the conventional linear compressor.
Figure 3B:
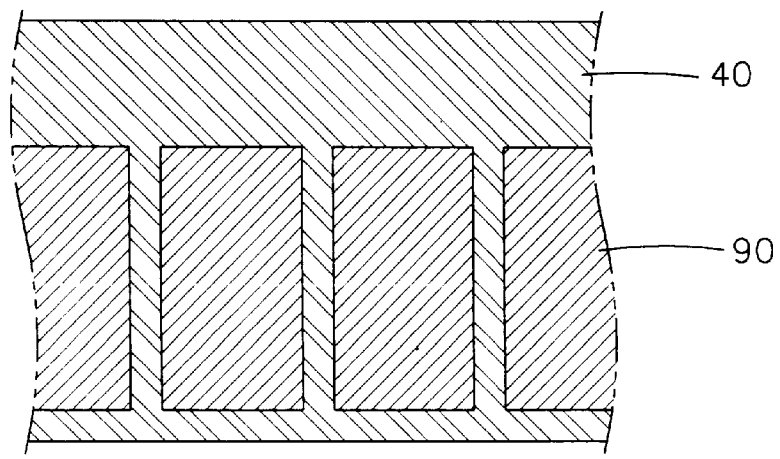
FIG. 3B is a front view of the magnet fixed structure in FIG. 3A.
Figure 4A:
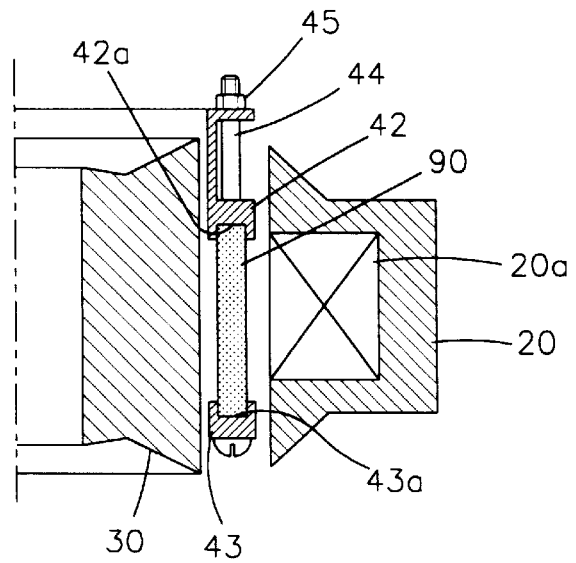
FIG. 4A is a cross-sectional view according to a third example of the magnet fixed structure of the conventional linear compressor.
Figure 4B:
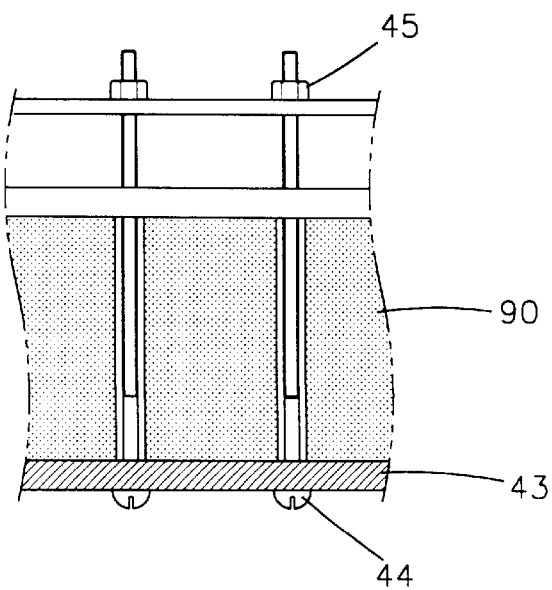
FIG. 4B is a front view of the magnet fixed structure in FIG. 4A.
Figure 5A:
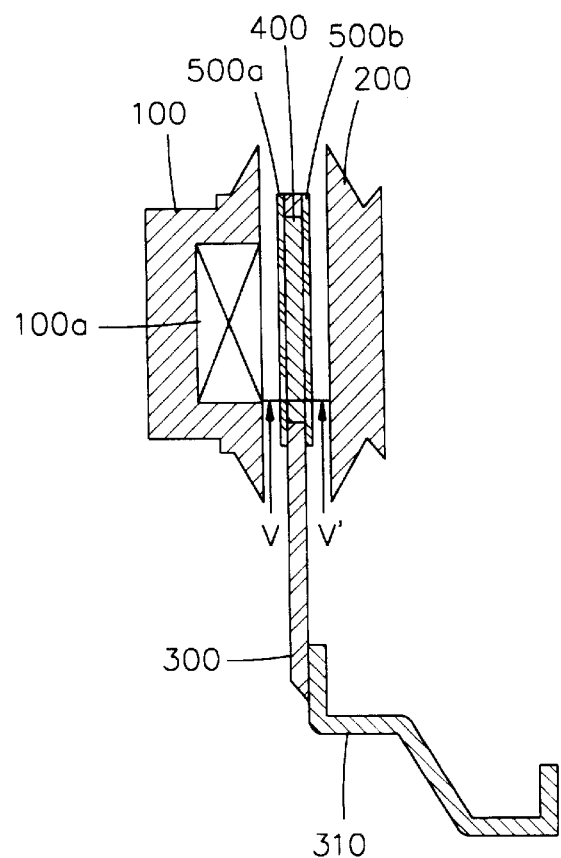
FIG. 5A is a cross-sectional view of a magnet fixed structure for a compressor motor according to a first embodiment of the present invention.

FIG. 5A illustrates a magnet fixed structure for a compressor motor according to a first embodiment of the present invention.

As shown therein, a cylindrical magnet paddle 300 which is coupled with a piston (not shown) by a connecting member 310 and linearly straight reciprocates is disposed between an inner lamination 200 and an outer lamination 100 in which a coil 100a is disposed.

Figure 5B:
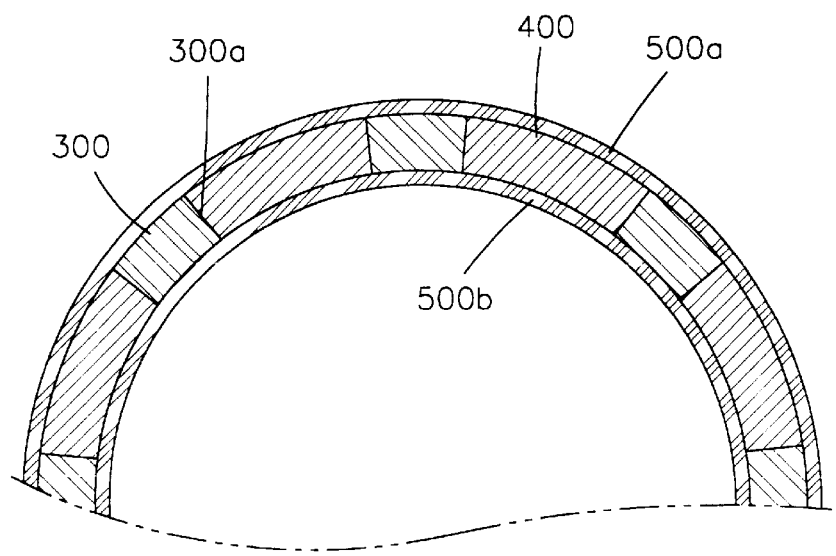
FIG. 5B is a cross-sectional view taken along the line V–V' in FIG. 5A.
Figure 6:
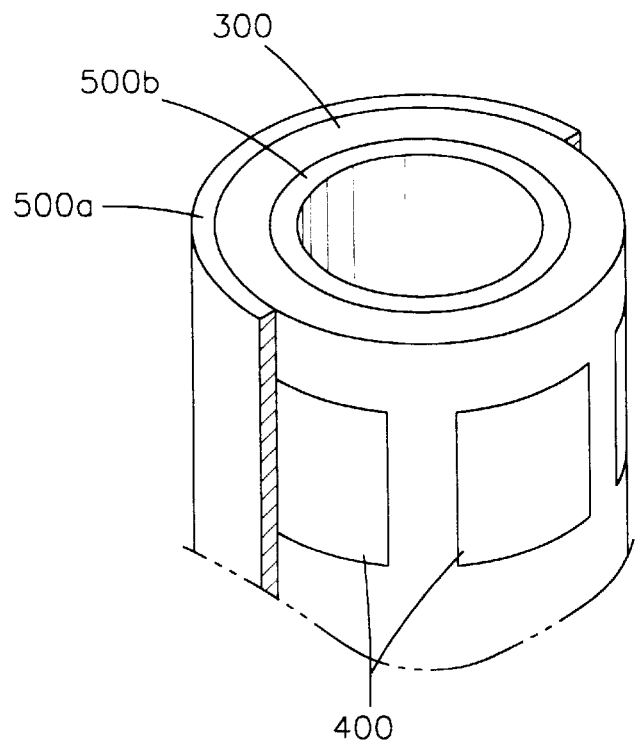
FIG. 6 is a partially cut-away perspective view of the magnet fixed structure according to the first embodiment of the present invention.

With reference to FIGS. 5B and 6, the magnet fixed structure according to the first embodiment of the present invention will be described in detail.

A plurality of magnet insertion holes 300a are formed in the magnet paddle 300 at regular intervals. Here, projected inner and outer circular arcs of each hole 300a have the identical length. Magnets 400 each of inner and outer circular arcs has the identical length are inserted into the corresponding magnet insertion holes 300a.

Next, magnet fixing rings 500a, 500b are put to an upper part to a lower part of the magnet paddle 300 into which the magnets 400 are inserted, for thereby being tightly attached to outer and inner circumferential surfaces of the magnet paddle 300. Between the magnet fixing rings 500a, 500b attached to the magnet paddle 300, the one connected with the coil 100a is formed of a non-magnetic material and the other one is formed of a magnetic material.

In other words, since the coil 100a is formed at the side of the outer lamination 100, the fixing ring 500a attached to the outer side of the magnetic paddle 300 is formed of the non-magnetic body while the fixing ring 500b attached to the inner side thereof is the magnetic body.

On the other hand, when the coil 100a is formed at a side of the inner lamination 200, the fixing ring 500a attached to the outer side of the magnetic paddle 300 is formed of the magnetic body and the fixing ring 500b attached to the inner side thereof is formed of the non-magnetic body.

Figure 7:
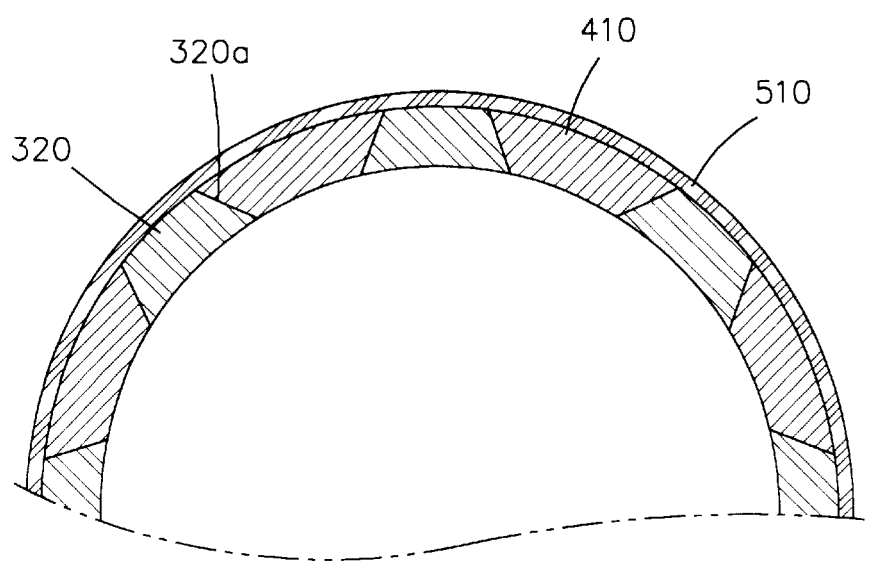
FIG. 7 is a cross-sectional view illustrating another type of the magnet fixed structure according to the first embodiment of the present invention.

Referring to FIG. 7, another type of the magnet fixed structure according to the first embodiment of the present invention will be described.

As shown therein, magnet insertion holes 320a each projected inner circular arc is shorter than a corresponding projected outer circular arc are formed in a cylindrical magnet paddle 320 at a regular interval.

Accordingly, magnets 410 having the same sectional shape as the magnet insertion hole 320a are inserted into the corresponding magnet insertion holes 320a.

The magnet paddle 320 to which the magnets 410 are inserted is inserted into a magnet fixing ring 510 from an upper portion to a lower portion of the magnet paddle 320, for thus an outer circumferential surface of the magnet paddle 320 is tightly attached to an inner wall of the magnet fixing ring 510.

Contrarily, the projected inner circular arc of the magnet insertion hole 320a can be longer than the corresponding projected outer circular arc thereof. Also, the magnets 410 have the same sectional shape as the magnet insertion hole 320a. Here, an outer circumferential surface of the magnet fixing ring 510 is tightly attached to an inner circumferential surface of the magnet paddle 320.

Figure 8:
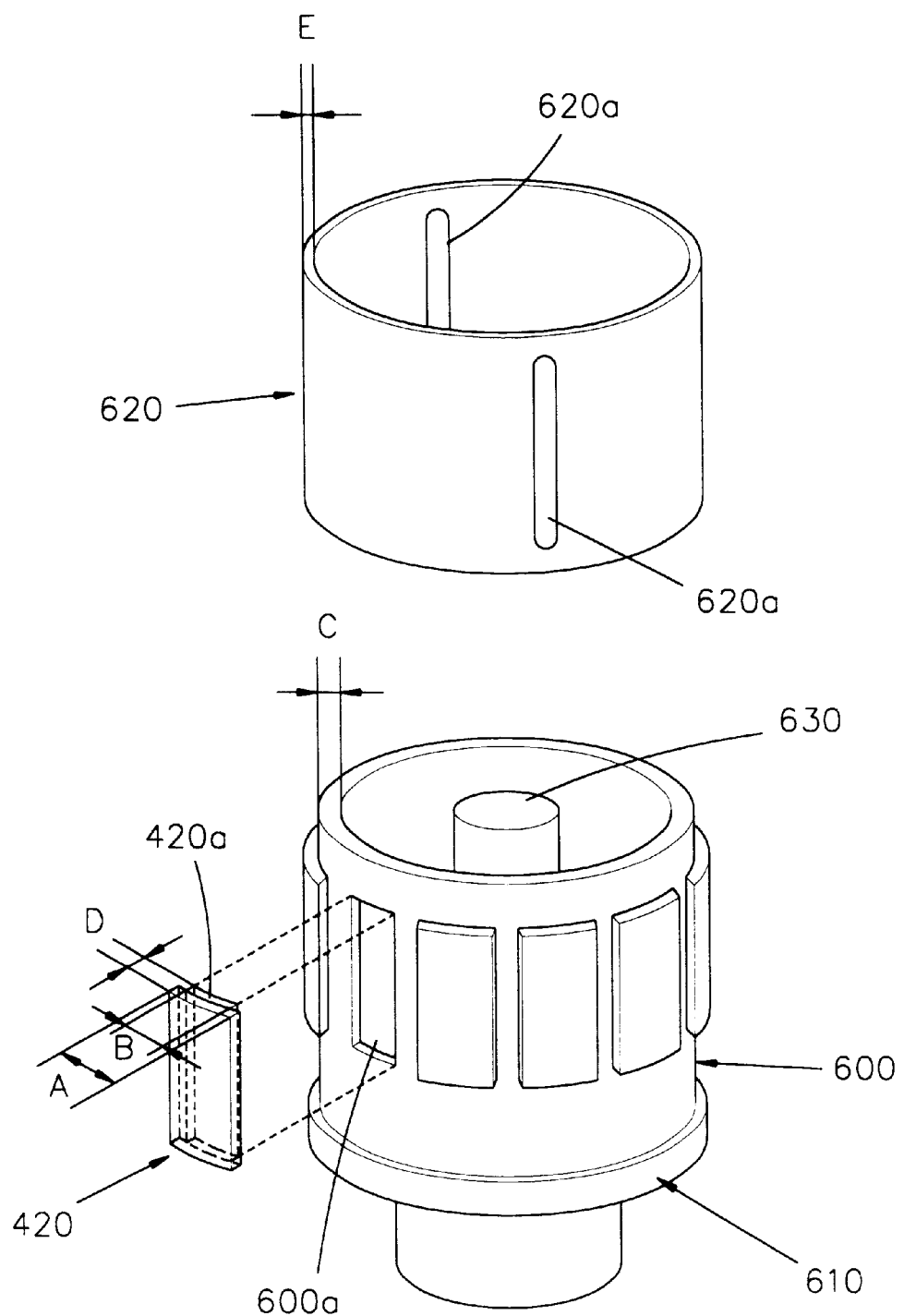
FIG. 8 is a perspective view of a magnet fixed structure for a compressor motor according to a second embodiment of the present invention.
Figure 9:
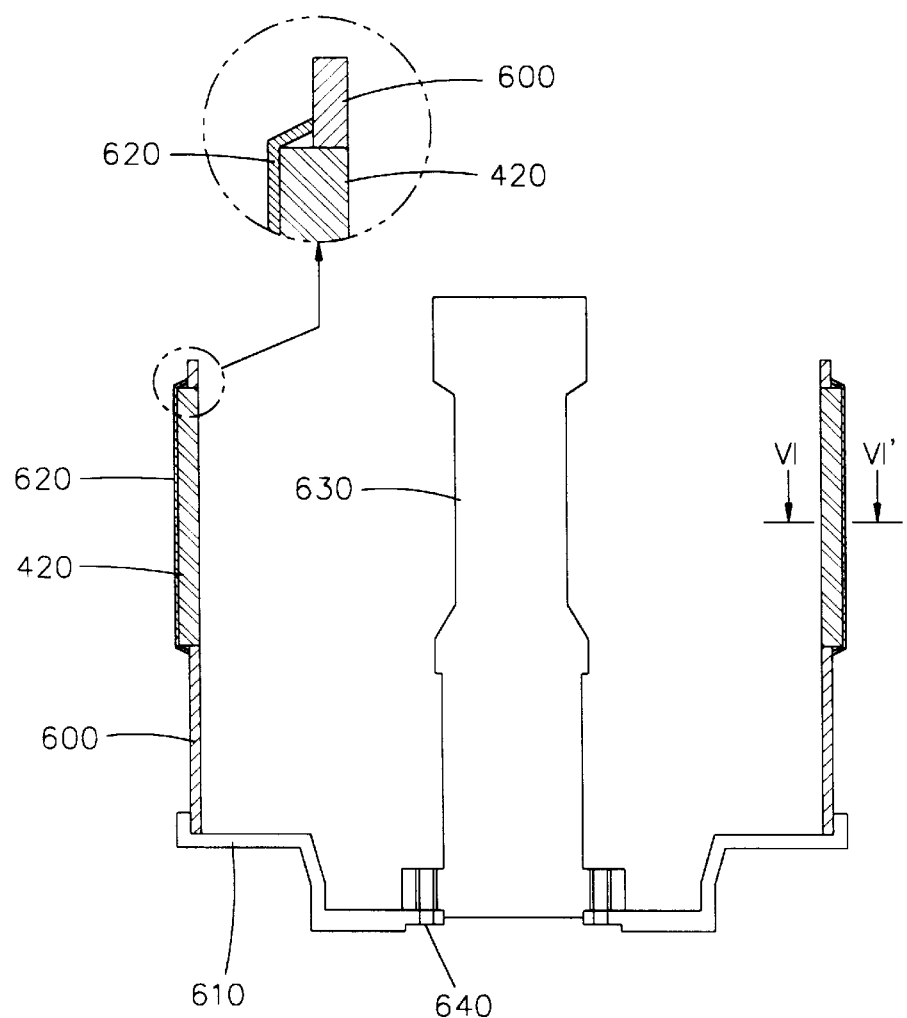
FIG. 9 is a vertical cross-sectional view of the magnet fixed structure according to the second embodiment of the present invention.
Figure 10:
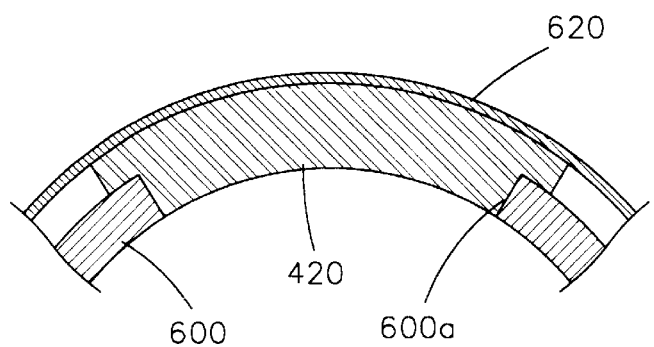
FIG. 10 is a cross-sectional view taken along the line VI–VI' in FIG. 9.

A magnet fixed structure according to a second embodiment of the present invention will be described with reference to FIGS. 8 through 10.

As shown therein, a disc-type second paddle 610 is fixed to a piston 630 by a fastening bolt 640 or a welding process, and a cylindrical first paddle 600 has a plurality of magnet insertion holes 600a each receiving a magnet 420. The first paddle 600 is fixed to the second paddle 610 by the welding. Here, the first paddle 600 can be fixed to the second paddle 610 as a single body.

A non-magnetic magnet fixing ring 620 having a plurality of slits 620a on a circumference thereof is tightly attached to outer circumferential surfaces of the magnets 420 which are inserted into the first paddle 600.

A circular arc A of the magnet 420 is slightly longer than a circular arc B of the insertion hole 600a of the first paddle

600. An insertion portion 420a as thick as a thickness C of the first paddle 600 is formed at one side of the magnet 420 and inserted into the insertion hole 600a of the first paddle 600.

The first paddle 600 into which the magnet 420 is inserted has a smooth inner circumferential surface.

Reference numerals D and E are the thickness of the magnet 420 and the magnet fixing ring 620, respectively.

The insertion portion 420a of each magnet 420 is inserted into the insertion hole 600a of the first paddle 600, and the first paddle 600 is inserted into the magnet fixing ring 620. Thus outer surfaces of the magnets 420 are tightly attached to an inner wall of the magnet fixing ring 620. Next, upper and lower end portions of the magnet fixing ring 620 are inwardly bent. Thus the magnets 420 are more tightly fixed to the first paddle 600.

Figure 11:
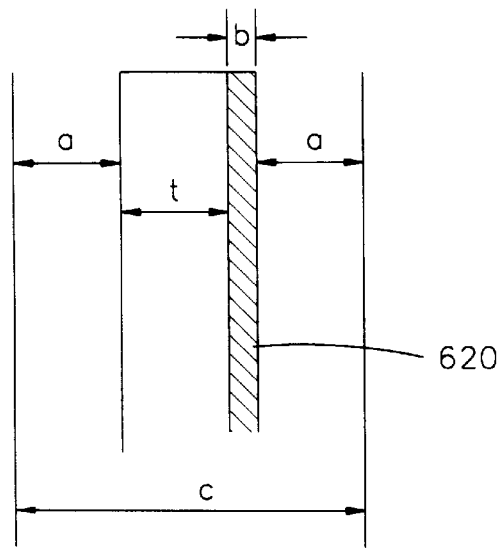
FIG. 11 is a schematic diagram illustrating a length of a gap between an inner lamination and an outer lamination of the compressor motor according to the present invention.

Referring to FIG. 11, an effect of the thusly fixed magnet structure will be explained.

In a gap (c) formed between the inner and the outer laminations (not shown), there exist each width (a) for mechanical tolerance, a width (t) of the magnet and a width (b) of the fixing ring.

In the above magnet fixed structure, the gap (c) between the inner and the outer laminations can be decreased by reducing the thickness of the fixing ring which fixes the magnets. In FIG. 11, t is a fixed thickness of the magnet required for the motor, a is an extra length for mechanical processing ranged from 0.3 to 0.5 mm, b is a thickness of the fixing member and c is a width of the gap between the laminations.

The slits 620a formed at the magnet fixing ring 620 reduce the eddy current loss occurred during the operation of the motor.

Now, a magnet fixed structure according to a third embodiment of the present invention will be explained.

Figure 12:
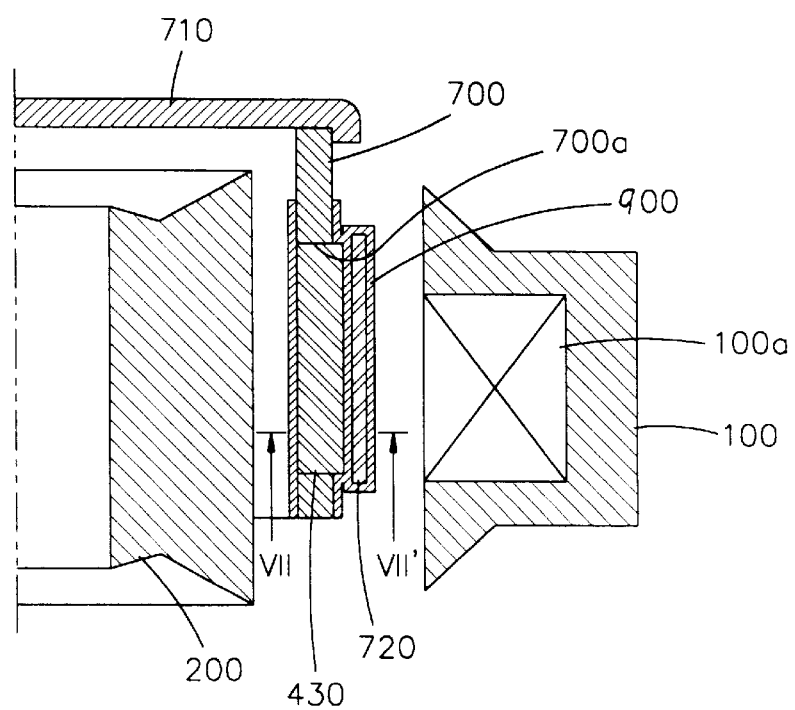
FIG. 12 is a cross-sectional view of a magnet fixed structure for a compressor motor according to a third embodiment of the present invention.
Figure 13:
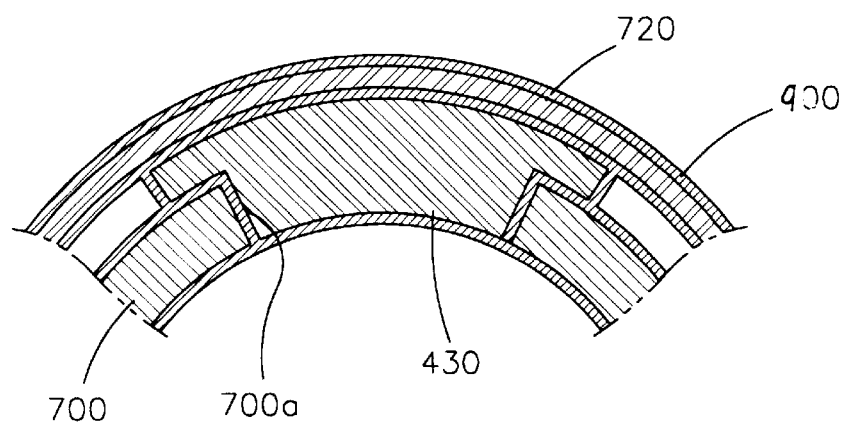
FIG. 13 is a cross-sectional view taken along the line VII–VII' in FIG. 12.

As shown in FIGS. 12 and 13, a plurality of magnet insertion holes 700a each receiving a magnet 430 are formed along a circumference of a first magnet paddle 700.

The first magnet paddle 700 is inserted into a non-magnetic magnet fixing ring 720. Thus outer surfaces of the magnets 430 are attached to an inner wall of the magnet fixing ring 720. A varnish-type molding member 900 is applied to each surface of the first magnet paddle 700, the magnets 430 and the magnet fixing ring 720. Here, the molding member 900 can be substituted for other materials, such an epoxy, which are not reactive to refrigerant and oil, thermostable and durable.

Reference numerals 100, 200 and 710 are an outer lamination, an inner lamination and a second magnet paddle, respectively.

Now, a method for applying the molding member to the thusly provided magnet fixed structure will be explained.

First, the magnets 430 are inserted into the corresponding magnet insertion holes 700a of the first magnet paddle 700 linked with a piston (not shown), and the first paddle 700 inserted into the magnet fixing ring 720 is put in a molding solution for a predetermined time so that the molding solution soaks through each gap among the components 700, 430 and 720, or the solution spreads on each surface thereof.

There are various methods for putting the first paddle 700 in the molding solution.

That is, there are methods which the magnets 430 are molded alone, the first paddle 700 and the magnets 430 are molded, the first paddle 700, the second paddle 710 and the magnets 430 are molded and the complete magnet fixed structure of the first paddle 700, the second paddle 710, the magnets 430 and the magnet fixing ring 720 is molded.

When the first magnet paddle 700 is taken out of the molding solution after the predetermined time, a molding layer 900 is formed, for thus firmly fixing the components 700, 430 and 720. Since the thickness of the molding layer 900 is about 20 μm, the layer 900 does not seriously affect the length of the gap between the inner and outer laminations 100, 200.

Figure 14:
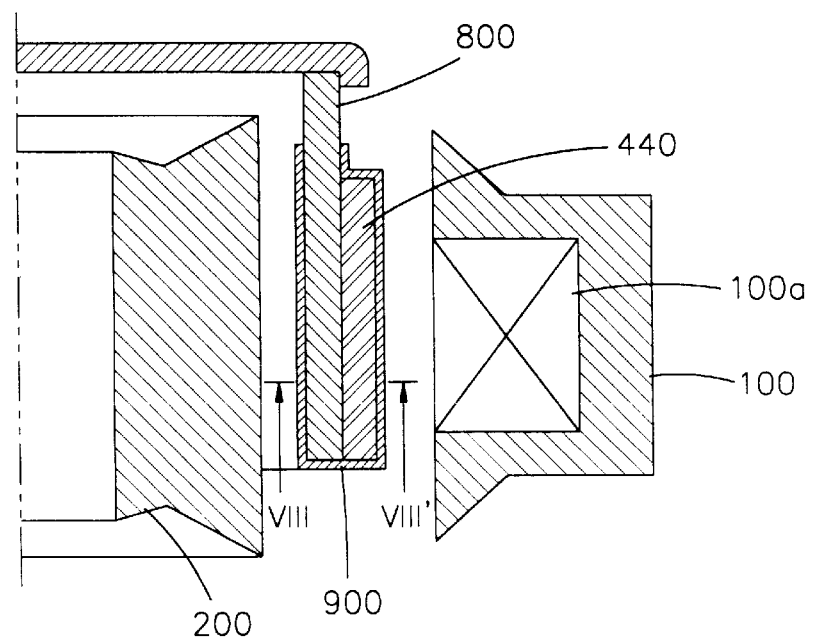
FIG. 14 is a cross-sectional view of another type of the magnet fixed structure according to the third embodiment.
Figure 15:
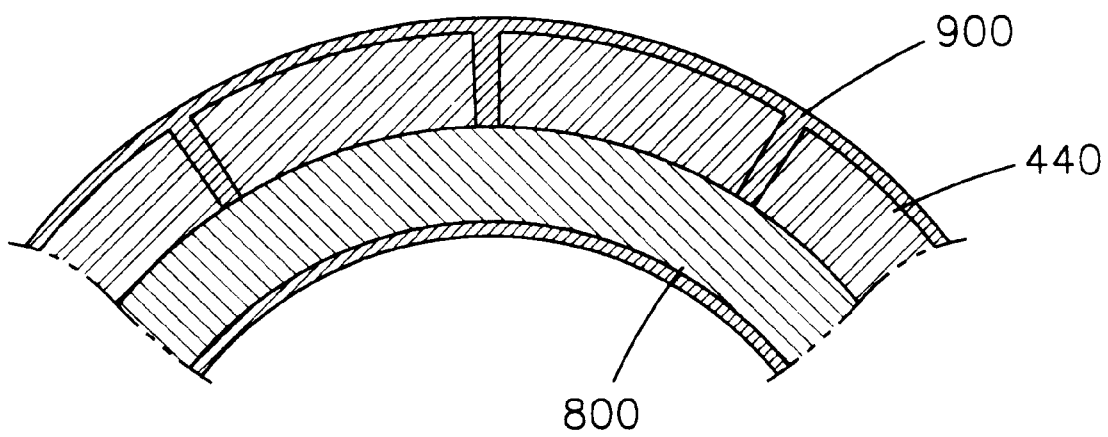
FIG. 15 is a cross-sectional view taken along the line VIII–VIII' in FIG. 14.

In addition, FIGS. 14 and 15 explain another type of the magnet fixed structure according to the third embodiment of the present invention.

As shown therein, with the above-described method, a cylindrical first paddle 800 to which a plurality of magnets 440 are fixed is put in a molding solution and taken out thereof, for thus a molding layer 900 is formed.

As described above, the magnet fixed structure for the compressor motor according to the present invention prevents the magnets from coming off or being broken, for thus improving reliability and efficiency of the motor as well as mass productivity thereof.

It will be apparent to those skilled in the art that various modifications and variations can be made in the magnet fixed structure for the compressor motor of the present invention without departing from the spirit or scope of the invention. Thus, it is intended that the present invention cover the modifications and variations of this invention provided they come within the scope of the appended claims and their equivalents.

What is claimed is:

1. In a compressor motor provided with an outer lamination and an inner lamination, a magnet fixed structure for a compressor motor, comprising:

a cylindrical magnet paddle disposed between the outer and inner laminations having a plurality of magnet insertion holes formed alone a circumference thereof, wherein a projected inner and outer circular arcs of each magnet insertion hole have a different length, the inner circular arc being measured alone an inner surface of the cylindrical magnet paddle and the outer circular arc being measured along an outer surface of the cylindrical magnet paddle;

a plurality of magnets inserted into the magnet insertion holes; and a magnet fixing ring fixed to the inner surface of the magnet paddle if the projected inner circular arc is longer than the projected outer circular arc and fixed to the outer surface of the magnet paddle, which has a) if the projected outer circular arc is longer than the projected inner circular arc of the magnet insertion hole.

2. The magnet fixed structure for a compressor motor as recited in claim 1, wherein a pair of magnet fixing rings are provided with a first one fixed to the inner surface of the magnet paddle and the other fixed to an outer surface of the magnet paddle.

3. The structure according to claim 2, wherein the magnets have the same thickness and width as said magnet insertion holes of the magnet paddle.

4. The structure according to claim 2, wherein a plurality of slits are formed in the magnet fixing rings in order to reduce eddy current loss due to an induced current.

5. The structure according to claim 2, wherein a molding layer is formed on each surface of the magnet paddle, the magnets and the magnet fixing ring, and in gaps thereamong.

6. The structure according to claim 5, wherein the molding member is a varnish.

* * * * *